United States Patent Office 3,497,431
Patented Feb. 24, 1970

3,497,431
PROCESS FOR THE ELECTROCHEMICAL
PRODUCTION OF OLEFIN OXIDES
Walter Kronig and Peter Konrad, Leverkusen, Germany, assignors to Farbenfabriken Bayer Aktiengesellschaft, Leverkusen, Germany, a corporation of Germany
No Drawing. Filed Jan. 12, 1967, Ser. No. 608,755
Claims priority, application Germany, Jan. 25, 1966, F 48,244
Int. Cl. B01k $1/00$, $3/10$; C07b $3/00$
U.S. Cl. 204—80    5 Claims

ABSTRACT OF THE DISCLOSURE

Electrochemical production of olefin oxides from olefins in an electrochemical cell system including an anode and a cathode separated by an interposed diaphragm so as to form correspondingly an anode compartment and a cathode compartment, in the presence of an aqueous electrolyte containing a metal halide, which comprises operating the system while using an average hydrostatic pressure in the anode compartment which is 10–700 mm. (water column) higher than that in the cathode compartment.

---

This invention relates to a process for the electrochemical production of olefin oxides. More particularly, the present invention relates to such a process wherein different pressures are used in the anode and cathode compartment.

It is known that olefin oxides can be produced from olefins by an electrochemical process comprising electrolysing an aqueous solution of a metal halide in an electrochemical system, introducing the olefin into the reaction in the vicinity of the anode and dehydrohalogenating the halohydrin initially formed in an electrochemical system to form the olefin oxide (cf. Belgian patent specification No. 637,691 and French patent specification No. 1,375,973). In particular, the process is carried out by passing the electrolyte from the anode compartment through a diaphragm into the cathode compartment, in which case an olefin halohydrin is formed from the olefin introduced into the anode compartment under the electrochemical effect, transferring the olefin halohydrin dissolved in the electrolyte through the diaphragm and converting the olefin halohydrin into the olefin oxide in the cathode compartment under the effect of the alkaline conditions prevailing therein. Several of these systems consisting of anode, diaphragm and cathode can be combined together to form a cell unit.

We have now found that the process described, namely, the electrochemical conversion of olefins into olefin oxides in a system of an anode, a cathode and a diaphragm arranged therebetween, in the presence of an aqueous electrolyte containing a metal halide which is passed from the anode compartment through the diaphragm into the cathode compartment, can be carried out with particular advantage if the average hydrostatic pressure in the anode compartment is between 10 mm. and 700 mm., advantageously between 30 mm. and 300 mm. (water column) higher than in the cathode compartment. In addition, it is of particular advantage if the excess pressure in the anode compartment is substantially the same throughout the cell. In a preferred embodiment of the process, the excess pressure of the anode compartment does not fluctuate by more than 20% from the average value in the area around the electrodes covered by the electrolyte.

The excess pressure in the anode compartment can be adjusted by the resistance which the diaphragm offers to the electrolyte flowing therethrough. Inert materials are suitable for use as the diaphragm in the process according to the invention. Examples of such materials are asbestos, polyfluorohydrocarbons, polyolefins, such as polypropylene, polyethylene, polybutylenes and polystyrenes, polyacrylonitrile, polyvinyl compounds such as polyvinyl chloride or copolymers of vinyl chloride and vinylidene chloride and so on. The materials can be used in the form of permeable or porous plates or films or as fibres in the form of woven and non-woven fabrics. Fabrics of polyacrylonitrile fibres whose pore size has preferably been reduced by heat and/or pressure treatment, for example, by calendering, have inter alia proved to be particularly suitable.

In order to adjust as uniform an excess pressure as possible at all levels of the cell in which the two plate electrodes (anode, cathode) are arranged opposite to, and parallel with, one another, it is important to ensure that the gas loads per unit of the horizontal cross-sectional area of the cell in the two electrolyte zones (anode and cathode compartments) differ as little as possible from one another at all levels of the cell. The fluctuations in the gas loads per unit cross-section are not intended to exceed the mean value by more than 20%. It is possible by applying suitable geometry in the design of the compartment to adjust the uniform gas loads per unit cross-section in the two electrolyte zones. It is important that the average gas loads per unit cross-section in the two electrolyte zones should not differ appreciably from one another. Any change in the gas load per unit cross-section with level produced in the cathode compartment as a result of the fact that the quantity of gas increases as the level increases due to the uniform evolution of hydrogen over the total area of the cathode can be compensated by inclining the rear wall of the cathode compartment in relation to the vertical in such a way that the change in the gas load per unit cross-section with the level is counteracted. In this connection, it is of particular advantage if the gas load of the horizontal cross-section of the cathode compartment does not fluctuate by more than ±10% from the average value. The most favourable dimensions of the cathode compartment can be determined by test according to the prevailing conditions.

Suitable starting materials for the production of the olefin oxide include in particular gaseous mono-olefins such as ethylene, propylene and butylenes, as well as halogenated mono-olefins such as allyl chloride for example. Aqueous solutions of sodium or potassium chloride, for example, or mixtures thereof, can be used as the electrolyte. The concentration of the salts in the electrolyte can, for example, amount to between 2% and 20%, advantageously to between 3% and 15%. The anode and cathode can be rectangular in shape, in which case the two electrodes are arranged opposite to, and parallel with, one another. The anode can be porous so that the starting material introduced in the form of a gas can be diffused through the pores of the anode into the anode compartment. Alternatively, the gaseous olefins may be introduced through a frit or similar means of distribution arranged beneath the anode. The olefins can even be introduced by other methods providing they ensure fine distribution of the gas in the anolyte.

Graphite, for example, or titanium coated with a thin layer of noble metals such as platinum, rhodium, iridium, ruthenium or mixtures thereof or oxides thereof may be used as the anode material. The aqueous electrolyte is introduced into the anode compartment and is passed through the diaphragm and the cathode into the cathode compartment in quantities of between 10 and 100 cm.$^3$/min. per dm.$^2$ of cathode surface. The catholyte issuing from the cathode compartment can be freed from the olefin oxide present therein, for example, by distillation, and returned to the anode compartment, thus closing the circuit. If secondary products formed during electrolysis have accumulated to a certain extent in the circulating electrolyte, it is of advantage to remove some of the electrolyte from the circuit and to replace it with fresh electrolyte. The process can be carried out, for example, at current densities of 2 to 50 amperes/dm.$^2$ of apparent electrode surface, with voltages of 3.25 v. and at temperatures of 20° C. to 90° C. Although it is with advantage carried out at normal pressure, the process can even be carried out at a slightly elevated pressure.

The process according to the invention is of particular significance in electrolytic cells of fairly large overall dimensions, particularly at heights of the kind encountered in industrial plants, for example at electrode heights covered by the electrolyte of between 300 and 1000 mm.

The invention is illustrated by the following examples:

EXAMPLE 1

(a) An electrolytic cell in which the plate-form anode and the wire gauze cathode were arranged opposite to, and parallel with, one another was used. Both the anode and the cathode were 100 mm. wide and 750 mm. tall. The anode consisted of a platinized titanium plate and the cathode of a stainless steel wire gauze. The diaphragm arranged between the two electrodes lay very close to the wire gauze cathode. The gap between the anode and that surface of the diaphragm which faces the anode was 10 mm. The rear wall of the cathode compartment was separated from that surface of the cathode which was facing it by an average distance of 2.5 mm., and was inclined in relation to the vertical in such a way that the gap at the lower end of the cathode was 1 mm. and the gap at the upper end of the cathode was 4 mm. The diaphragm consisted of a fabric made of individual polyacrylonitrile filaments. Before fixing in the cell, this fabric had been passed between two rollers which were heated to a temperature of 210° C., and which were pressed against one another under a pressure of 120 kg. per cm. of roller width. The cell was filled with an aqueous solution containing 5% by weight of potassium chloride. 10 litres per hour of this solution were transferred from the anode compartment to the cathode compartment. The average excess pressure in the anode compartment amounted to 120 mm. with maximum fluctuations of 20%. 112 litres per hour of a $C_3$-fraction containing 92% of propylene, the rest mainly consisting of propane, were introduced in gaseous form through a frit arranged at the lower end of the anode plate. By applying an electric potential between the anode and the cathode, an electric current was passed through the cell in such a way as to produce a current density of 6.3 amperes per dm.$^2$ of apparent anode surface. The overall voltage of the cell amounted to 3.6 v. The temperature of the electrolyte was 52° C. The cell worked at atmospheric pressure. The average gas load per unit cross-section amounted to 10 litres per cm.$^2$ per hour both in the anode compartment and in the cathode compartment. 24% of the propylene passed through the anode compartment was reacted. The yield of reaction products present in the spent anode gas and in the spent cathode gas or catholyte was as follows, expressed as a percentage of the current reacted.

| Reaction product: | Yield in percent |
| --- | --- |
| Propylene oxide | 89.0 |
| 1,2-dichloropropane | 8.0 |
| Propylene glycol | 0.7 |
| Propylene chlorohydrin | 0.7 |
| Other organic products | 0.9 |
| Oxygen | 0.5 |
| $CO_2$ | 0.2 |

(b) The process described in Example (1a) was carried out under the same conditions, the only difference being that an electrolytic cell was used in which the horizontal cross-section of the anode and cathode compartment were the same, i.e. in this case the distance between the surface of the cathode and the rear wall was 10 mm. and hence as large as the gap between the surface of the anode and the surface of the diaphragm. The rear wall of the cathode compartment was parallel with the surface of the cathode. In addition, the same fabric as in Example (1a) was used as the diaphragm, but not subjected to the preceding pressure and heat treatment. The average excess pressure in the anode compartment amounted to a 2 mm. water column. In other respects, the run was carried out in the same way as that described in Example (1a). The following yields were obtained, expressed as percentages of the current applied: 73.5% as propylene oxide; 16.0% as propylene glycol.

It is apparent from these results that, when the experiment is carried out in this way, not only is the propylene oxide yield very much lower, but the amount of polypropylene glycol formed is also a serious disadvantage which literally precludes the possibility of running the cell continuously on a cyclic basis.

EXAMPLE 2

(a) The electrolytic cell described in Example (1a) was used, the only difference being that the rear wall of the cathode compartment was at an average distance of 5 mm. from that surface of the cathode which faces it. The diaphragm consisted of a polyacrylonitrile fabric, which, before use in the cell, had been calendered at 170° C. under a linear pressure of 160 kg. per cm. of roller width, the rollers rotating at a peripheral speed of 5.8 metres per minute. The cell was filled with an aqueous solution of 5% potassium chloride. 17.5 litres per hour of this solution were passed from the anode compartment through the diaphragm into the cathode compartment. The average recess pressure in the anode compartment was 50 mm. with a maximum fluctuation of 20%. 104 litres per hour of a $C_3$ fraction containing 92% of propylene, the rest being almost exclusively propane, were introduced in gaseous form into the anode compartment through a frit arranged at the lower end of the anode plate. By applying a D.C. voltage of 4.0 v. between the cathode and the anode, an electric current with a density of 11.4 a./dm.$^2$ of apparent anode surface flowed through the cell. The temperature of the electrolyte was 52° C. The cell worked at atmospheric pressure. The average gas load per unit cross-section was 10 litres per cm.$^2$ per hour both in the anode compartment and in the cathode compartment. 47% of the propylene passed through the anode compartment was converted. The yield of reaction products present in the spent anode and cathode gas and in the catholyte was as follows, expressed as a percentage of the current converted.

| Reaction product: | Yield in percent |
| --- | --- |
| Propylene oxide | 88.6 |
| 1,2-dichloropropane | 8.2 |
| Propylene glycol | 0.9 |
| Propylene chlorohydrin | 0.7 |
| Other organic products | 0.9 |
| Oxygen | 0.5 |
| $CO_2$ | 0.2 |

(b) The experiment described in Example (2a) was repeated under the same conditions, the only difference being that an electrolytic cell was used in which, as in Example (1b), the horizontal cross-sections both of the anode compartment and of the cathode compartment were equal, i.e. the gap between the cathode surface and the rear wall of the cathode and the gap between the anode surface and the surface of the diaphragm were both 10 mm. In addition, the same fabric as in Example (2a) was used as the diaphragm but not subjected to the preceding pressure and heat treatment. The average excess pressure in the anode compartment amounted to a 2 mm. water column. The yields obtained in this run were as follows, expressed as precentages of the current converted: 74.8% as propylene oxide; 14.9% as propylene glycol.

EXAMPLE 3

(a) The electrolytic cell described in Example (1a) was used. The only difference was that, in this case, the diaphragm consisted of a polyacrylonitrile fabric which before fixing in the cell had been calendered at a temperature of 220° C. and a linear pressure of 160 kg. per cm. of roller width. The rollers rotated at a peripheral speed of 3.5 metres per minute. The cell was filled with an aqueous solution of 5% potassium chloride. 17.5 litres per hour of this solution were passed from the anode compartment through the diaphragm into the cathode compartment. The average excess pressure in the anode compartment amounted to 260 mm., with maximum fluctuations of 15%. 205 litres per hour of a $C_2$-fraction containing 95% of ethylene were introduced into the anode compartment through a frit arranged at the lower end of the anode. By applying a D.C. voltage of 4.4 v. between anode and cathode, a current with a density of 11.6 A./dm.$^2$ apparent anode surface flowed through the cell. The temperature of the electrolyte was 52° C. The average gas load per unit cross-section both of the anode compartment and of the cathode compartment was 20 litres per cm.$^2$ per hour. 25% of the ethylene passed through the anode compartment was converted. The yields of reaction products present in the spent cathode and anode gas and in the catholyte were as follows, expressed as percentages of the current applied:

| Reaction product: | Yield in percent |
| --- | --- |
| Ethylene oxide | 85.0 |
| 1,2-dichloroethane | 6.3 |
| Ethylene glycol | 0.9 |
| Ethylene chlorohydrin | 5.9 |
| Other organic products | 0.8 |
| Oxygen | 0.8 |
| $CO_2$ | 0.3 |

(b) The experiment described in Example (3a) was repeated under the same conditions, the only difference being that an electrolytic cell was used in which, as in Example (1b), the horizontal cross-sections both of the anode compartment and of the cathode compartment were the same, i.e. in this case the gap between the surface of the cathode and the rear wall of the cathode compartment and the gap between the surface of the anode and the surface of the diaphragm were both 10 mm. In addition, the same fabric as in Example (3a) was used as the diaphragm but not subjected to the preceding heat and pressure treatments. The average excess pressure in the anode compartment amounted to a 4 mm. water column. The yields obtained in this run were as follows, expressed as percentages of the current applied: 67.8% as ethylene oxide; 18.3% as ethylene glycol.

What we claim is:
1. A procss for the electrochemical production of olefin oxides from olefins in an electrochemical cell system including an anode, a cathode and a diaphragm arranged therebetween, whereby to form correspondingly an anode compartment and a cathode compartment, in the presence of an aqueous electrolyte containing a metal halide, which comprises operating the system while using an average hydrostatic pressure in the anode compartment which is 10 to 700 mm. higher than that in the cathode compartment.

2. A process as claimed in claim 1, wherein the hydrostatic excess pressure in the anode compartment is obtained by using a diaphragm offering a suitable resistance to the electrolyte as it flows through the diaphragm.

3. A process as claimed in claim 1, wherein the hydrostatic excess pressure in the anode compartment does not fluctuate by more than 20% from the average hydrostatic excess pressure at all levels of the cell.

4. A process as claimed in claim 3, wherein the geometric forms of the anode compartment and of the cathode compartment are such that the average gas loads of the horizontal cross-section of both the compartments do not differ by more than 20% from one another.

5. A process as claimed in claim 4, wherein the rear wall of the cathode compartment is inclined in relation to the vertical in such a way that the gas load of the horizontal cross-section of the cathode compartment does not fluctuate by more than 10% from the average value.

References Cited

UNITED STATES PATENTS

| 1,253,615 | 1/1918 | McElroy | 204—81 |
| 1,253,617 | 1/1918 | McElroy | 204—80 |
| 1,308,797 | 7/1919 | McElroy | 204—80 |
| 3,288,692 | 11/1966 | Le Duc | 204—80 |

JOHN H. MACK, Primary Examiner

H. M. FLOURNOY, Assistant Examiner